United States Patent
Ku et al.

(10) Patent No.: US 12,445,009 B2
(45) Date of Patent: Oct. 14, 2025

(54) MOTOR

(71) Applicant: LG INNOTEK CO., LTD., Seoul (KR)

(72) Inventors: Ju Hwan Ku, Seoul (KR); Jae Young Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 166 days.

(21) Appl. No.: 18/268,765

(22) PCT Filed: Feb. 17, 2022

(86) PCT No.: PCT/KR2022/002325
§ 371 (c)(1),
(2) Date: Jun. 21, 2023

(87) PCT Pub. No.: WO2022/177309
PCT Pub. Date: Aug. 25, 2022

(65) Prior Publication Data
US 2024/0048019 A1    Feb. 8, 2024

(30) Foreign Application Priority Data

Feb. 17, 2021    (KR) .................. 10-2021-0021013

(51) Int. Cl.
*H02K 5/173*    (2006.01)
*F16C 33/58*    (2006.01)
(Continued)

(52) U.S. Cl.
CPC .......... *H02K 5/1732* (2013.01); *F16C 33/583* (2013.01); *F16C 35/04* (2013.01); *H02K 7/083* (2013.01)

(58) Field of Classification Search
CPC .... H02K 5/1732; H02K 7/083; F16C 33/583; F16C 35/04
See application file for complete search history.

(56) References Cited

U.S. PATENT DOCUMENTS 1,326,892 A  *  12/1919  Reynolds .............. F16C 23/084
                                                          384/906
9,543,796 B2 *  1/2017   Park ....................... H02K 5/163
(Continued)

FOREIGN PATENT DOCUMENTS

EP           2923436          3/2017
JP         2017-022801         1/2017
(Continued)

OTHER PUBLICATIONS

European Search Report dated Dec. 18, 2024 issued in Application No. 22756507.4.
(Continued)

*Primary Examiner* — Terrance L Kenerly
(74) *Attorney, Agent, or Firm* — KED & ASSOCIATES (57) ABSTRACT

An embodiment provides a motor comprising: a shaft; a rotor coupled to the shaft; a stator arranged to correspond to the rotor; a housing accommodating the stator; a first bearing supporting the shaft; and a bearing housing supporting the first bearing, wherein the first bearing includes a first inner surface disposed toward the shaft and a first outer surface disposed opposite to the first inner surface, the first inner surface is slidably arranged with respect to the shaft, and the first outer surface is fixed to the bearing housing.

16 Claims, 11 Drawing Sheets

(51) Int. Cl.
  *F16C 35/04* (2006.01)
  *H02K 7/08* (2006.01)

(56) References Cited

U.S. PATENT DOCUMENTS

| | | | | |
|---|---|---|---|---|
| 10,181,764 | B2* | 1/2019 | Kim | H02K 5/1735 |
| 11,750,048 | B2* | 9/2023 | Kim | H02K 5/04 |
| | | | | 310/152 |
| 11,791,685 | B2* | 10/2023 | Kim | H02K 7/083 |
| | | | | 310/71 |
| 2010/0132186 | A1 | 6/2010 | Hargraves et al. | |
| 2016/0365769 | A1 | 12/2016 | Raczek et al. | |
| 2019/0363605 | A1 | 11/2019 | Kim | |

FOREIGN PATENT DOCUMENTS

| | | |
|---|---|---|
| KR | 10-2017-0079425 | 7/2017 |
| KR | 10-1969789 | 4/2019 |
| KR | 10-2019-0093354 | 8/2019 |
| KR | 10-2019-0124667 | 11/2019 |
| KR | 10-2135647 | 7/2020 |

OTHER PUBLICATIONS

International Search Report dated May 27, 2022 issued in Application No. PCT/KR2022/002325.

* cited by examiner

MOTOR

CROSS-REFERENCE TO RELATED PATENT APPLICATIONS

This application is a U.S. National Stage Application under 35 U.S.C. § 371 of PCT Application No. PCT/KR2022/002325, filed Feb. 17, 2022, which claims priority to Korean Patent Application No. 10-2021-0021013, filed Feb. 17, 2021, whose entire disclosures are hereby incorporated by reference.

TECHNICAL FIELD

The present invention relates to a motor.

BACKGROUND ART

A motor includes a rotor and a stator. In this case, the rotor rotates due to an electrical interaction between the rotor and the stator. In addition, the motor includes a bearing which supports the shaft.

The bearing may be moved in conjunction with axial movement of the shaft which is driven at a high speed. Accordingly, a supporting force of the bearing may be reduced, and the driving stability of the motor can be reduced.

DISCLOSURE

Technical Problem

Accordingly, the present invention is directed to providing a motor in which the driving stability of a bearing is secured against movement of a shaft.

Objectives to be solved by embodiments are not limited to the objectives described above, and objectives which are not described above will be clearly understood by those skilled in the art from the following descriptions.

Technical Solution

One aspect of the present invention provides a motor including a shaft, a rotor coupled to the shaft, a stator disposed to correspond to the rotor, a housing configured to accommodate the stator, a first bearing which supports the shaft, and a bearing housing which supports the first bearing, wherein the first bearing includes a first inner surface disposed to face the shaft and a first outer surface disposed to face an opposite side of the first inner surface, the first inner surface is disposed to be slidable on the shaft, and the first outer surface is fixed to the housing.

Advantageous Effects

According to an embodiment, a lower portion of a shaft can be fixed to prevent axial and radial movement of the shaft, and the shaft can be fastened to an upper bearing through a sliding fit method to minimize movement of the upper bearing due to movement of the shaft.

Accordingly, the axial and radial movement of the shaft can be reduced, and the driving stability of the upper bearing can be secured against the movement.

In addition, a washer and grease can be omitted to reduce a cost, and a problem of assembly failure can be solved.

Various useful advantages and effects of the embodiments are not limited to the above-described contents and will be more easily understood from descriptions of the specific embodiments.

MODES OF THE INVENTION

Hereafter, an exemplary embodiment of the present invention will be described in detail with reference to the accompanying drawings.

A direction parallel to a longitudinal direction (vertical direction) of a shaft is referred to as an axial direction, a direction perpendicular to the axial direction based on the shaft is referred to as a radial direction, and a direction along a circle having a radius in the radial direction based on the shaft is referred to as a circumferential direction.

Figure 1:
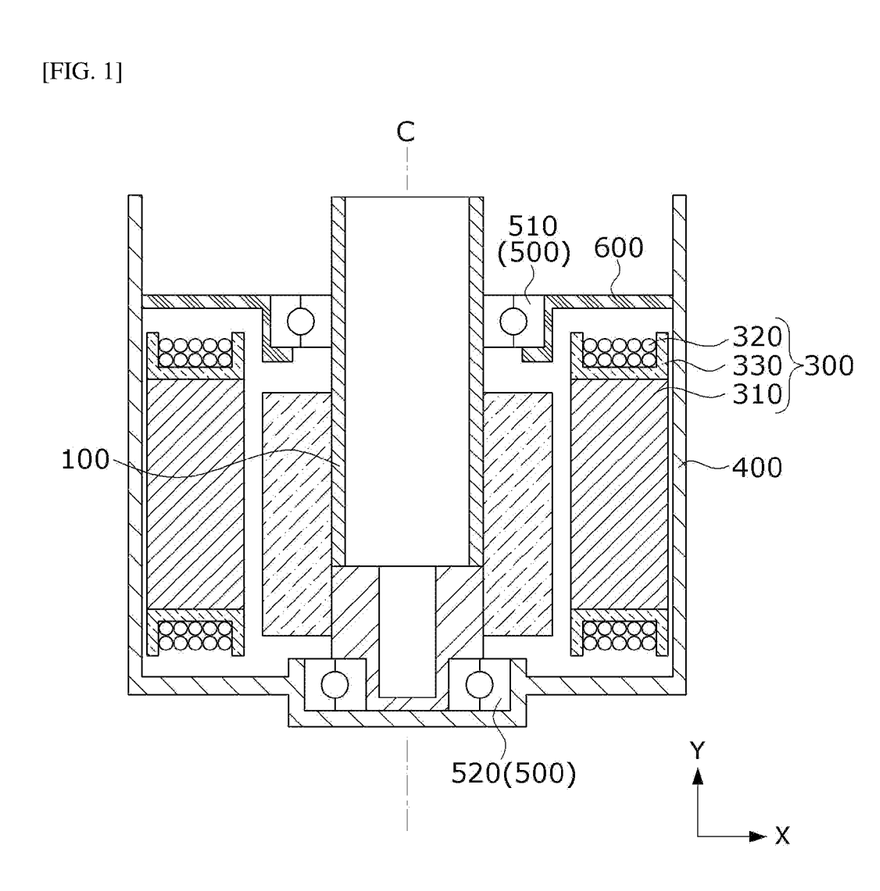
FIG. 1 is a cross-sectional view illustrating a motor according to an embodiment.

FIG. 1 is a cross-sectional view illustrating a motor according to an embodiment. In FIG. 1, an X direction may be a radial direction, and a Y direction may an axial direction. In addition, a reference symbol "C" illustrated in FIG. 1 may be a rotary center of the shaft 100.

Referring to FIG. 1, the motor may include the shaft 100, a rotor 200, a stator 300, a housing 400, bearings 500, and a bearing housing 600.

Hereafter, the term "inward" is a direction from the housing 400 toward the shaft 100 which is a center C of the motor, and the term "outward" is a direction opposite to "inward," that is, the direction from the shaft 100 toward the housing 400.

The shaft 100 may be a hollow member of which one side is open. The shaft 100 may be disposed so that parts having different outer diameters are divided in the axial direction. The shaft 100 may include a first part 110 and a second part 120. The first part 110 and the second part 120 may be disposed in the axial direction. Meanwhile, the shaft 100 may be a single member.

The shaft 100 may be coupled to the rotor 200. When a current is supplied, an electromagnetic interaction occurs between the rotor 200 and the stator 300, the rotor 200 rotates, and the shaft 100 rotates in conjunction with the rotor 200. The shaft 100 may be connected to a steering system of a vehicle and transmit power to the steering system.

The rotor 200 rotates due to an electrical interaction between the rotor 200 and the stator 300. The rotor 200 may be disposed inside the stator 300. The rotor 200 may include a rotor core and a rotor magnet disposed on the rotor core.

The stator 300 is disposed outside the rotor 200. The stator 300 may include a stator core 310, a coil 320, and an insulator 330 mounted on the stator core 310. The coil 320 may be wound around the insulator 330. The insulator 330 is disposed between the coil 320 and the stator core 310. The coil induces an electrical interaction with the rotor magnet.

The housing 400 may be disposed outside the stator 300. The housing 400 may be a cylindrical member of which one side is open. A shape or a material of the housing 400 may variously vary, and a metal material which can endure well even at high temperatures may be selected.

Each of the bearings 500 may support the shaft 100. The bearings 500 may include a first bearing 510 and a second bearing 520. The first bearing 510 and the second bearing 520 may be disposed to be spaced apart from each other in the axial direction. In this case, the first bearing 510 may be disposed in the bearing housing 600. In addition, the second bearing 520 may be disposed in the housing 400.

The bearing housing 600 may support the bearing 500. In addition, the bearing housing 600 may be coupled to the housing 400. In addition, a hole through which the shaft 100 passes may be formed in the bearing housing 600.

Figure 2:
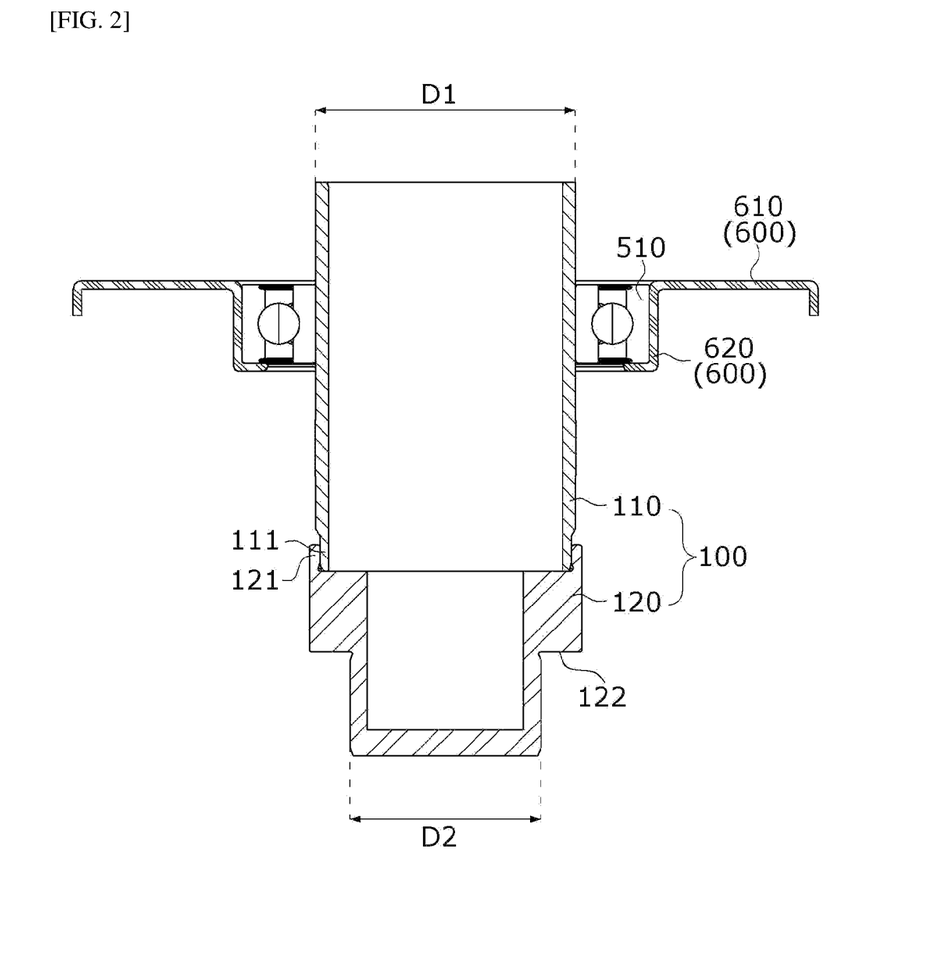
FIG. 2 is a cross-sectional view illustrating a shaft, a first bearing, and a bearing housing.
Figure 3:
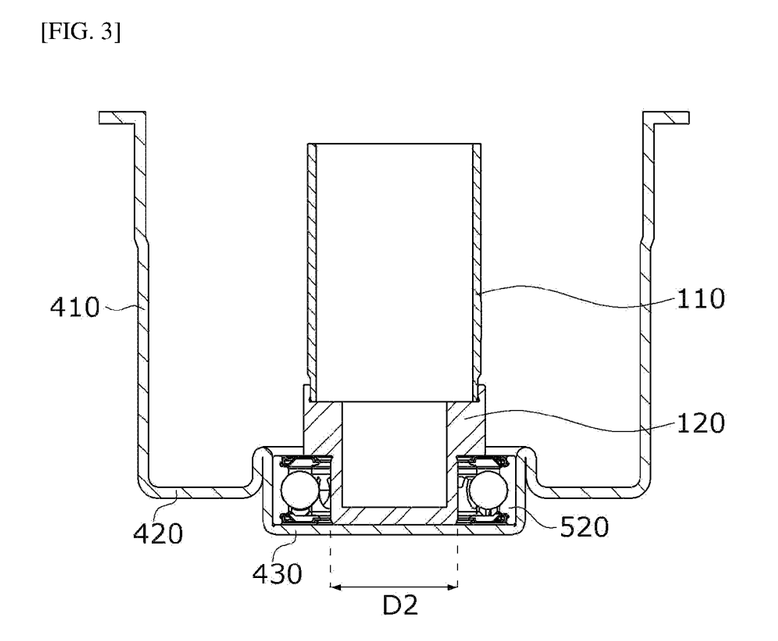
FIG. 3 is a cross-sectional view illustrating the shaft, a second bearing, and a housing.

FIG. 2 is a cross-sectional view illustrating the shaft, the first bearing, and the bearing housing, and FIG. 3 is a cross-sectional view illustrating the shaft, the second bearing, and the housing.

Referring to FIG. 2, the shaft 100 may include the first part 110 and the second part 120. The first part 110 and the second part 120 may have outer circumferential surfaces having different diameters D1 and D2. The diameter D2 of the outer circumferential surface of the second part 120 may be smaller than the diameter D1 of the outer circumferential surface of the first part 110. The second part 120 may include an upper region coupled to the first part 110 and a lower region disposed under the upper region. In addition, the second bearing 520 may be disposed outside the lower region. In this case, a diameter of an outer circumferential surface of the upper region may be different from a diameter of an outer circumferential surface of the lower region. Specifically, the diameter of the outer circumferential surface of the upper region may be greater than the diameter of the outer circumferential surface of the lower region. Accordingly, the second part 120 may include an end step 122. In addition, the end step may be disposed on an inner ring of the second bearing 520 to support the second bearing 520. In this case, the upper region may be referred to as a first region of the second part 120, and the lower region may be referred to as a second region of the second part 120.

The first part 110 may include a first end portion 111 coupled to the second part 120. In addition, the second part 120 may include a second end portion 121 coupled to the first end portion 111. In this case, the first end portion 111 and the second end portion 121 may overlap in the radial direction. As illustrated in FIG. 2, the second end portion 121 may be disposed outside of the first end portion 111. In addition, when the first end portion 111 and the second end portion 121 are coupled, a groove may be concavely formed in the shaft 100 in the radial direction.

In addition, the first part 110 and the second part 120 may overlap the rotor 200 in the radial direction. Specifically, an upper portion of the rotor 200 may be disposed in contact with the first part 110, and a lower portion of the rotor 200 may be disposed in contact with the upper region of the second part 120.

The first part 110 and the second part 120 may be separate parts. In this case, the first part 110 and the second part 120 may also be integrally formed with each other.

The first bearing 510 may be disposed on the first part 110. In addition, the first bearing 510 may support the first part 110. In addition, the first bearing 510 may be supported by the bearing housing 600.

The first bearing 510 may be disposed outside the first part 110. The first bearing 510 may be slidably disposed on the outer circumferential surface of the first part 110. That is, the first bearing 510 may be fastened to the shaft 100 through a sliding fit method. In this case, a diameter of an inner circumferential surface of the first bearing 510 may be greater than the diameter D1 of the first part 110.

The bearing housing 600 may include a plate portion 610 and a first bearing pocket 620.

The plate portion 610 may be spaced apart from the stator 300 in the axial direction. The plate portion 610 may be coupled to the housing 400. In addition, the plate portion 610 may have a circular hole formed to vertically pass therethrough.

The first bearing pocket 620 may be disposed inside the plate portion 610.

The first bearing 510 may be disposed in the first bearing pocket 620. The first bearing 510 may be fixedly installed in the first bearing pocket 620. An outer circumferential surface of the first bearing 510 may be the same as an inner circumferential surface of the first bearing pocket 620. The first bearing 510 may be press-fitted into the first bearing pocket 620.

Referring to FIG. 3, the second bearing 520 may be disposed on the second part 120.

The second bearing 520 may be fixed to the outer circumferential surface of the second part 120. Accordingly, the shaft 100 may be press-fitted into the second bearing 520. In this case, a diameter D4 of an inner circumferential surface of the second bearing 520 may be the same as the diameter D2 of the second part 120. The diameter of the inner circumferential surface of the second bearing 520 may be smaller than the diameter of the inner circumferential surface of the first bearing 510.

The housing 400 may include a body 410, a bottom surface 420, and a second bearing pocket 430.

The body 410 may have a cylindrical shape. The stator 300 may be disposed inside the body 410. The body 410 may be coupled to the bearing housing 600. The bottom surface 420 may extend inward from the body 410. The bottom surface 420 may be spaced apart from the stator 300 in the axial direction. In addition, the second bearing pocket 430 may be disposed inside the bottom surface 420. The second bearing 520 may be disposed in the second bearing pocket 430.

The second bearing 520 may be fixed to the second bearing pocket 430. An outer circumferential surface of the second bearing 520 may be the same as the inner circumferential surface of the second bearing pocket 430. The second bearing 520 may be press-fitted into the second bearing pocket 430.

Figure 4:
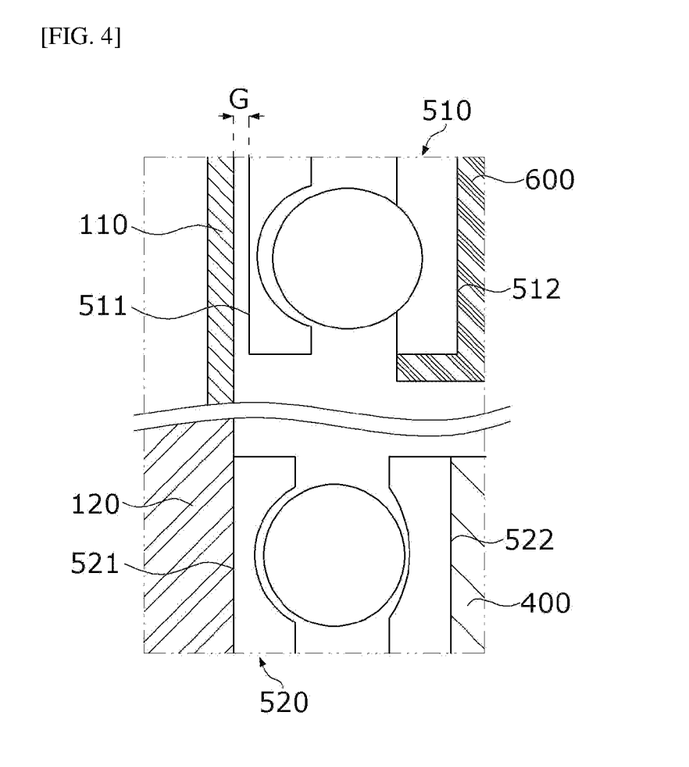
FIG. 4 is a schematic view illustrating a structure in which the shaft, the first bearing, the second bearing, the housing, and the bearing housing are coupled.

FIG. 4 is a schematic view illustrating a structure in which the shaft, the first bearing, the second bearing, the housing, and the bearing housing are coupled.

Referring to FIG. 4, the first bearing 510 may be fastened to the shaft 100 through the sliding fit method.

The first bearing 510 may include a first inner surface 511 and a first outer surface 512. The first inner surface 511 may be disposed to face the first part 110. In this case, a gap G may be formed between the first inner surface 511 and the first part 110. In addition, the first outer surface 512 may be disposed to face the bearing housing 600. The first outer surface 512 may be in contact with the bearing housing 600 without a gap. The first bearing 510 may be press-fitted into the bearing housing 600. In this case, the gap G may be called a gap.

Since the first bearing 510 and the shaft 100 are disposed with the gap interposed therebetween, and the first bearing 510 is fixed to the bearing housing 600, an axial position of the first bearing 510 may be fixed regardless of axial movement of the shaft 100.

The second bearing 520 may be fastened to the shaft 100 and the housing 400 through a press-fitting method.

The second bearing 520 may include a second inner surface 521 and a second outer surface 522. In this case, the second inner surface 521 may be an inner surface of the inner ring of the second bearing 520, and the second outer surface 522 may be an outer surface of an outer ring of the second bearing 520. The second inner surface 521 may be disposed to face the second part 120. The second inner surface 521 and the second part 120 may be in contact with each other without a gap. Accordingly, the second inner surface 521 may overlap the upper region of the second part 120 in the axial direction. In addition, the second outer surface 522 may be disposed to face the bearing housing 600. In this case, the second outer surface 522 may not overlap the upper region of the second part 120 in the axial direction. That is, the second outer surface 522 is disposed to be spaced apart from the upper region of the second part 120 in the radial direction and may overlap the rotor 200 in the axial direction. The second outer surface 522 may be in contact with the bearing housing 600 without a gap. The second bearing 520 may be press-fitted into the housing 400. In addition, the second part 120 may be press-fitted into the second bearing 520.

The second bearing 520 may be firmly fixed to the shaft 100 and the housing 400 to effectively prevent movement of the shaft 100.

In the motor according to the embodiment, axial and radial movement of the shaft 100 can be reduced by firmly fixing a lower portion of the shaft 100 using the second bearing 520 which is a lower bearing. In addition, an upper portion of the shaft 100 may be fastened to the first bearing 510 which is an upper bearing through the sliding fit method to minimize movement of the upper bearing occurring due to movement of the shaft 100. Accordingly, axial and radial movement of the shaft 100 can be reduced, and the driving stability of the upper bearing can be secured against movement.

Figure 5A:
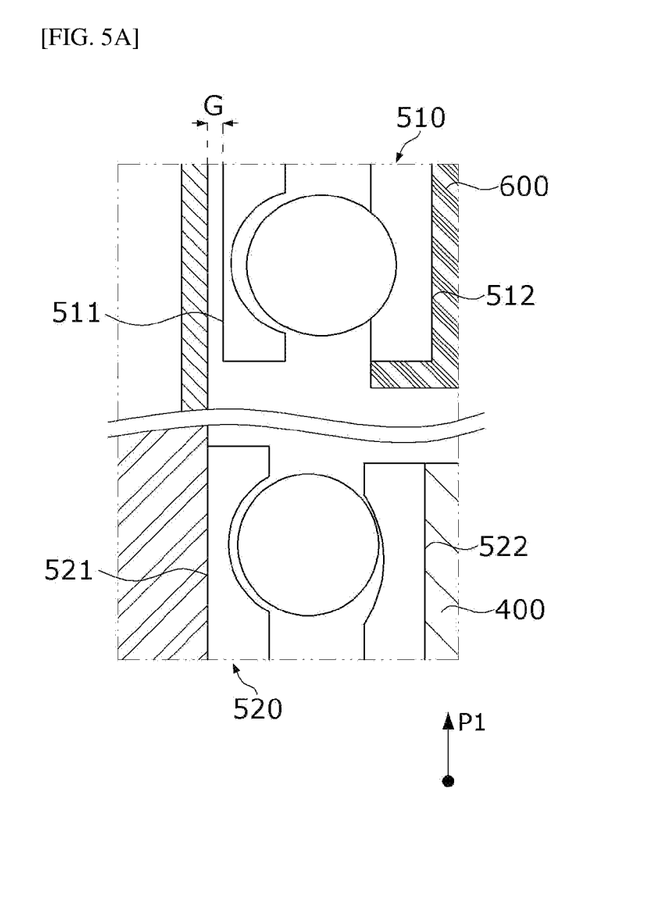
FIGS. 5A and 5B are views for describing changes in position of the first bearing, the second bearing, the housing, and the bearing housing according to axial movement of the shaft.
Figure 5B:
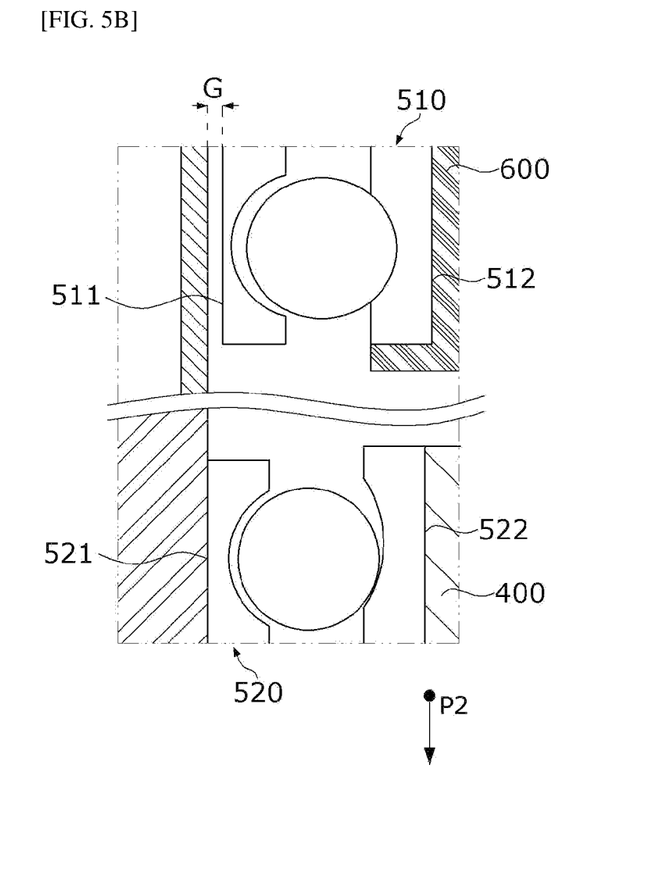

FIGS. 5A and 5B are views for describing changes in position of the first bearing, the second bearing, the housing, and the bearing housing according to axial movement of the shaft. In this case, FIG. 5A is the view for describing changes in position of the first bearing, the second bearing, the housing, and the bearing housing according to movement of the shaft in a first direction, and FIG. 5B is the view for describing changes in position of the first bearing, the second bearing, the housing, and the bearing housing according to movement of the shaft in a second direction.

Referring to FIG. 5A, a force may be applied in a first direction P1 by axial movement of the shaft 100. The first direction P1 is a direction from the housing 400 toward the bearing housing 600. That is, the force applied to the shaft 100 in the first direction P1 may be a force which pulls the shaft 100 from the housing 400.

The second inner surface 521 may be moved along the shaft 100 in the first direction P1. Meanwhile, the second outer surface 522 may be fixed to the housing 400. In this case, the second bearing 520 can prevent axial movement of the shaft 100 using a fixing force between the second outer surface 522 and the housing 400.

The first inner surface 511 and the first part 110 may be disposed with the gap G interposed therebetween. The first inner surface 511 may be separated from the shaft 100. Accordingly, a position of the first inner surface 511 may be maintained even when the shaft 100 moves in the first direction P1. An axial position of the first bearing 510 may be maintained regardless of movement of the shaft 100.

Referring to FIG. 5B, a force may be applied in a second direction P2 due to axial movement of the shaft 100. The second direction P2 is a direction from the bearing housing 600 toward the housing 400. That is, the force applied to the shaft 100 in the second direction P2 may be a force which pushes the shaft 100 toward the housing 400.

The second inner surface 521 may move along the shaft 100 in the second direction P2. However, as a second lower surface of the second bearing 520 is supported by the bearing pocket 430 of the housing 400, movement of the second inner surface 521 in the second direction P2 can be restricted. In addition, the second outer surface 522 may be fixed to the housing 400. The second bearing 520 may be firmly fixed to the housing 400 to prevent axial movement of the shaft 100.

Meanwhile, the first inner surface 511 may be separated from the first part 110 by the gap G. Accordingly, a position of the first inner surface 511 may be maintained even when the shaft 100 moves in the second direction P2. An axial position of the first bearing 510 may be maintained regardless of movement of the shaft 100.

Figure 6:
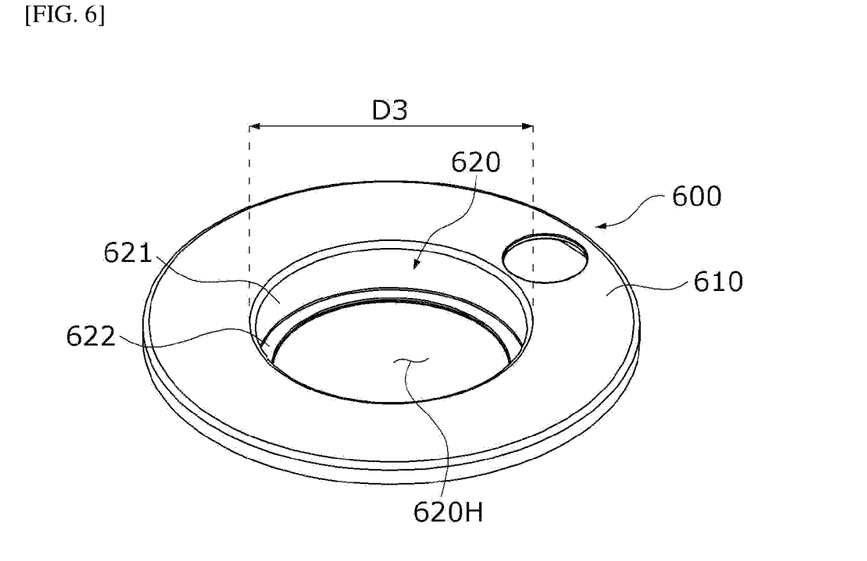
FIG. 6 is a perspective view illustrating the bearing housing.
Figure 7:
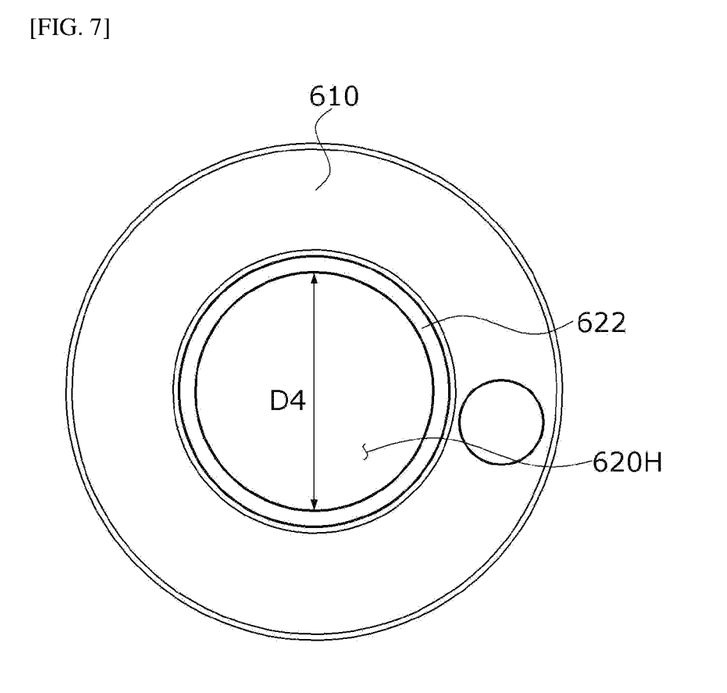
FIG. 7 is a plan view illustrating the bearing housing.

FIG. 6 is a perspective view illustrating the bearing housing, and FIG. 7 is a plan view illustrating the bearing housing.

Referring to FIGS. 6 and 7, the bearing housing 600 may include the plate portion 610 and the first bearing pocket 620.

The plate portion 610 may be coupled to the housing 400. The plate portion 610 may be spaced apart from the stator 300 in the axial direction. The first bearing pocket 620 may be disposed inside the plate portion 610.

A diameter D3 of the first bearing pocket 620 may be the same as a diameter of the first bearing. The first bearing 510 may be press-fitted into the first bearing pocket 620. The first bearing pocket 620 may be open to face an opposite side of the rotor 200. The first bearing 510 may be disposed in the first bearing pocket 620. A hole 620H through which the shaft 100 passes may be formed in the first bearing pocket 620. In this case, the diameter D4 of the hole 620H may be smaller than the diameter D3 of the first bearing pocket 620 and greater than a diameter of the shaft 100.

The first bearing pocket 620 may include a first portion 621 and a second portion 622.

The first portion 621 may extend from the plate portion 610 toward the rotor 200. The first portion 621 may be in contact with the first outer surface 512 of the first bearing 510. The first portion 621 may overlap the first bearing 510 in the radial direction.

The second portion 622 may extend inward from the first portion 621. The second portion 622 may support a first lower surface of the first bearing 510. The second portion 622 may support the first bearing 510 in the axial direction. As illustrated in FIG. 4, the second portion 622 may support a lower portion of an outer ring of the first bearing 510 in the axial direction. The second portion 622 may be disposed between the first bearing 510 and the rotor 200. The second portion 622 may include the hole 620H. In addition, since the first bearing pocket 620 is formed to be open toward the opposite side of the rotor 200, a first upper surface disposed at an opposite side of the first lower surface is not in contact with the first bearing pocket 620.

Figure 8A:
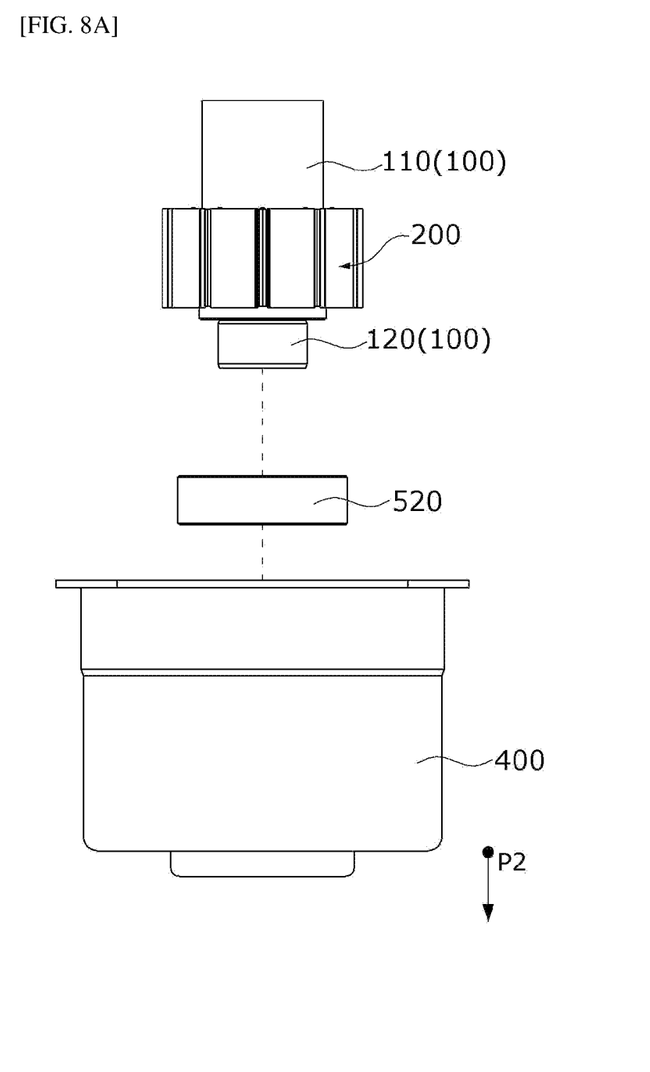
FIGS. 8A to 8C are perspective views for describing an assembly process of the motor according to the embodiment.
Figure 8B:
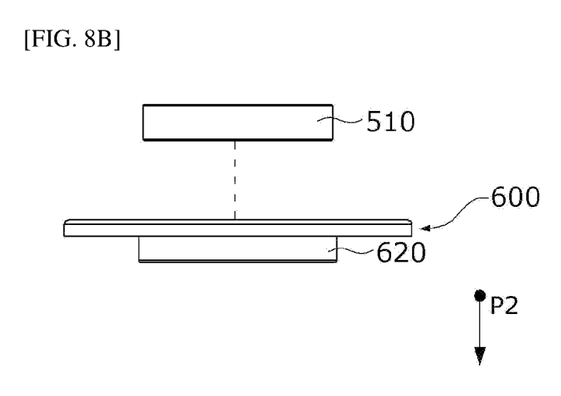
Figure 8C:
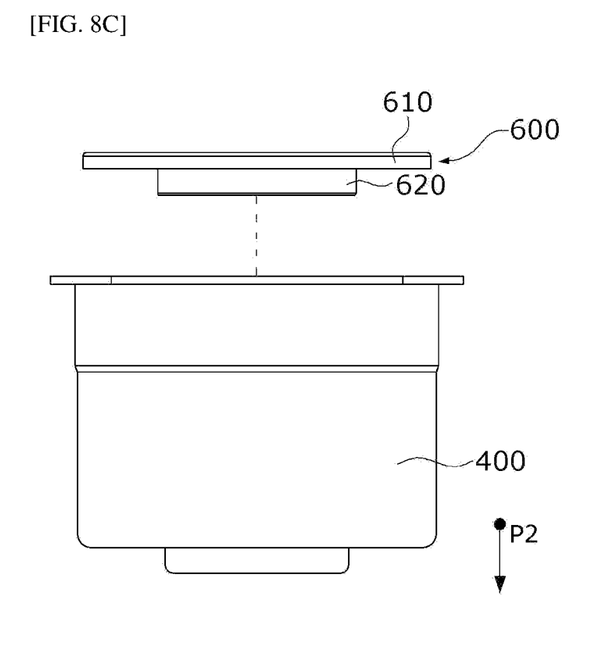

FIGS. 8A to 8C are perspective views for describing an assembly process of the motor according to the embodiment. FIG. 8A is the view illustrating the shaft, the housing, and an assembly process of the shaft when the motor is assembled according to the embodiment, FIG. 8B is a view illustrating an assembly process of the first bearing and the bearing housing when the motor is assembled according to the embodiment, and FIG. 8C is a view illustrating an assembly process of the housing and the bearing housing when the motor is assembled according to the embodiment.

Referring to FIG. 8A, the second bearing 520 and the shaft 100 may be sequentially press-fitted into the housing 400. First, the second bearing 520 may be press-fitted into the housing 400 in the second direction P2. In addition, the shaft 100 may be press-fitted into the second bearing 520. Accordingly, the second bearing 520 and the shaft 100 may be fixed to the housing 400.

Meanwhile, as illustrated in FIG. 8B, the first bearing 510 may be press-fitted into the bearing housing 600. In this case, the first bearing 510 may be press-fitted into the bearing pocket 620 in the second direction P2. Accordingly, the first bearing 510 may be fixed to the bearing housing 600.

As illustrated in FIG. 8C, the bearing housing 600 to which the first bearing 510 is fixed may be coupled to the housing 400. In this case, the first bearing 510 may be coupled to the shaft 100 through the sliding fit method.

In the motor according to the present invention, the lower portion of the shaft 100 can be fixed to prevent axial and radial movement of the shaft 100, and the upper portion of the shaft 100 can be fastened to the upper bearing through the sliding fit method to minimize movement of the upper bearing occurring due to the movement of the shaft 100.

Hereinafter, a moving distance of a shaft 100 of a motor according to each of comparative examples and examples was measured to more specifically describe effects of the present invention.

Table 1 shows separation distances between first and second bearings and a bearing housing, a shaft, and a housing of a motor according to each of the comparative examples and the examples. In addition, Table 2 is a result of measuring a moving distance of the shaft when a force is applied to the shaft of the motor in the axial direction according to each of the comparative examples and the examples.

In Comparative example 1 and Comparative example 2, a first bearing is press-fitted into and coupled to the shaft, and a second bearing is slid in and coupled to the shaft. In addition, in the examples, the first bearing is coupled to the shaft through the sliding fit method, and the second bearing is press-fitted into and coupled to the shaft.

In addition, in Comparative example 1 and Example 1, a force of 200 N was applied to the shaft in the first direction P1, and in Comparative example 2 and Example 2, a force of 7000 N was applied to the shaft in the second direction P2. In this case, the force in the first direction P1 is a force which pulls the shaft from the housing, and the force in the second direction P2 is a force which pushes the shaft toward the housing.

TABLE 1

|  | Separation distance (μm) between First bearing and Housing | Separation distance (μm) between First bearing and Shaft | Separation distance (μm) between Second bearing and Housing | Separation distance (μm) between Second bearing and Shaft |
|---|---|---|---|---|
| Comparative Example 1 | 30 | 0 | 0 | 25 |
| Comparative Example 2 | 30 | 0 | 0 | 25 |
| Example 1 | 0 | 25 | 0 | 0 |
| Example 2 | 0 | 25 | 0 | 0 |

TABLE 2

|  | Force (N) in P1 Direction | Force (N) in P2 Direction | Force (N) applied to First bearing | Force (N) applied to Second bearing | Moving distance (μm) in axial direction | Moving distance (μm) in radial direction |
|---|---|---|---|---|---|---|
| Comparative Example 1 | — | 7000 | 0 | 7200 | 500 | 55 |
| Comparative Example 2 | 200 | — | −200 | 0 | 500 | 55 |
| Example 1 | — | 7000 | 0 | 7000 | 10 | 25 |
| Example 2 | 200 | — | 0 | −200 | 10 | 25 |

Referring to Tables 1 and 2, in Example 1, although the same force in the same direction was applied as in Comparative example 1, it can be seen that a moving distance in the axial direction is decreased from 500 μm to 10 μm and a moving distance in the radial direction is decreased from 55 μm to 25 μm. In addition, in Example 2, although the same force in the same direction was applied as in Comparative example 2, it can be seen that a moving distance in the axial direction is decreased from 500 μm to 10 μm and a moving distance in the radial direction is decreased from 55 μm to 25 μm. As described above, in the examples, movement of the shaft can be decreased in any case in which a pulling or pushing force is applied to the shaft.

In the above embodiments, an example of an inner rotor type motor has been described, but the present invention is not limited thereto. The present invention can also be applied to an outer rotor type motor. In addition, the present invention can be used in various devices such as vehicles or home appliances.

While the present invention has been described above with reference to exemplary embodiments, it may be understood by those skilled in the art that various modifications and changes of the present invention may be made within a range not departing from the spirit and scope of the present invention defined by the appended claims.

REFERENCE NUMERALS

100: SHAFT
200: ROTOR
300: STATOR
400: HOUSING
500: BEARING
600: BEARING HOUSING

The invention claimed is:

1. A motor, comprising:
a shaft;
a rotor coupled to the shaft;
a stator disposed to correspond to the rotor;
a housing configured to accommodate the stator;
a bearing housing coupled to an upper portion of the housing;
a first bearing coupled to the bearing housing; and
a second bearing configured to support the shaft, wherein the first bearing includes a first inner surface of an inner ring disposed to face the shaft and a first outer surface of an outer ring disposed to face an opposite side of the first inner surface, wherein the inner ring of the first bearing is disposed to be spaced apart from the shaft to form a gap, wherein the first outer surface is fixed to the bearing housing, wherein the second bearing is configured to fix a lower portion of the shaft to reduce movement of the shaft, and wherein an upper portion of the shaft is slidably disposed with respect to the first bearing through the gap so as to maintain an axial position of the first bearing.

2. The motor of claim 1, wherein the gap is formed between the first inner surface and an outer circumferential surface of the shaft.

3. The motor of claim 1, wherein:
the first bearing includes a first lower surface disposed to face the rotor; and
the bearing housing is in contact with the first outer surface and the first lower surface.

4. The motor of claim 3, wherein:
the bearing housing includes a first bearing pocket in which the first bearing is disposed; and
the first bearing pocket includes a first portion in contact with the first outer surface and a second portion in contact with the first lower surface.

5. The motor of claim 4, wherein:
the first bearing includes a first upper surface disposed to face an opposite side of the first lower surface; and
the first upper surface is not in contact with the first bearing pocket.

6. The motor of claim 4, wherein:
the second portion includes a hole through which the shaft passes; and
a diameter of the hole is smaller than a diameter of the first bearing and greater than a diameter of the shaft.

7. The motor of claim 1, wherein the second bearing is disposed in the housing.

8. The motor of claim 7, wherein the second bearing includes:
a second inner surface disposed to face the shaft; and
a second outer surface disposed to face an opposite side of the second inner surface, wherein the second inner surface is fixed to the shaft, and wherein the second outer surface is fixed to the housing.

9. The motor of claim 8, wherein:
the shaft includes a first part and a second part which are disposed in an axial direction; and
a diameter of the first part is greater than a diameter of the second part.

10. The motor of claim 9, wherein:
the first bearing is disposed in a radial direction of the first part; and
the second bearing is disposed in a radial direction of the second part.

11. A motor, comprising:
a shaft;
a rotor coupled to the shaft;
a stator disposed to correspond to the rotor;
a housing configured to accommodate the stator;
a bearing housing coupled to an upper portion of the housing;
a first bearing coupled to the bearing housing; and
a second bearing coupled to the housing, wherein the first bearing is disposed to be spaced apart from the shaft, a first inner surface of the first bearing and an outer circumferential surface of the shaft are disposed with a predetermined gap interposed therebetween, wherein the second bearing is in contact with the outer circumferential surface of the shaft, wherein the shaft includes a first part and a second part which are disposed in an axial direction, wherein the first part includes a first end portion, wherein the second part includes a second end portion, and wherein the first end portion and the second end portion overlap in a radial direction.

12. The motor of claim 11, wherein the first bearing is disposed in a radial direction of the first part;
the second bearing is disposed in a radial direction of the second part; and
a diameter of the first part is different from a diameter of the second part.

13. The motor of claim 12, wherein the second part includes:
an upper region coupled to the first part; and
a lower region disposed under the upper region, wherein a diameter of an outer circumferential surface of the upper region is greater than a diameter of an inner circumferential surface of the lower region so that an end step is formed on the second part, and wherein the second bearing is disposed outside the lower region.

14. The motor of claim 13, wherein the end step supports an inner ring of the second bearing.

15. The motor of claim 13, wherein:
an upper portion of the rotor is in contact with the first part; and
a lower portion of the rotor is in contact with the upper portion.

16. The motor of claim 12, wherein:
the second bearing includes a second inner surface disposed to face the shaft and a second outer surface disposed at an opposite side of the second inner surface;
the second inner surface overlaps the second part in the axial direction; and
the second outer surface overlaps the rotor in the axial direction.

* * * * *